United States Patent
Wang

(10) Patent No.: US 9,683,592 B2
(45) Date of Patent: Jun. 20, 2017

(54) WOODEN SCREW

(71) Applicant: Rick Wang, Changhua (TW)

(72) Inventor: Rick Wang, Changhua (TW)

(73) Assignees: Masterpiece Hardware Industrial Co. Ltd., Changhua (TW); Rick Wang, Changhua (TW)

( * ) Notice: Subject to any disclaimer, the term of this patent is extended or adjusted under 35 U.S.C. 154(b) by 92 days.

(21) Appl. No.: 14/798,342

(22) Filed: Jul. 13, 2015

(65) Prior Publication Data

US 2017/0016467 A1     Jan. 19, 2017

(51) Int. Cl.
 *F16B 35/02* (2006.01)
 *F16B 25/00* (2006.01)
 *F16B 25/10* (2006.01)

(52) U.S. Cl.
 CPC ...... *F16B 25/0015* (2013.01); *F16B 25/0052* (2013.01); *F16B 25/0084* (2013.01); *F16B 25/103* (2013.01)

(58) Field of Classification Search
 CPC .......................... F16B 25/0015; F16B 25/0052
 USPC ......... 411/387.1, 387.2, 387.5, 387.7, 387.8, 411/386
 See application file for complete search history.

(56) References Cited

U.S. PATENT DOCUMENTS

| | | | | |
|---|---|---|---|---|
| 2,096,937 A * | 10/1937 | McManus | ........... | F16B 25/0021 411/418 |
| 2,200,227 A * | 5/1940 | Olson | ........... | F16B 5/0225 411/340 |
| 3,426,642 A * | 2/1969 | Phipard, Jr. | ........ | F16B 25/0021 411/417 |
| 4,725,175 A * | 2/1988 | Jesson | ........... | B21K 1/56 408/227 |
| 4,730,969 A * | 3/1988 | Dohi | ........... | F16B 25/0084 408/211 |
| 5,487,633 A * | 1/1996 | Roberts | ........... | B21H 3/027 411/187 |
| 6,698,987 B1 * | 3/2004 | Dicke | ........... | F16B 25/0031 411/387.4 |
| 7,686,556 B2 * | 3/2010 | Belinda | ........... | E04C 3/12 411/387.2 |
| 2006/0153662 A1 * | 7/2006 | Chen | ........... | F16B 25/0052 411/387.1 |
| 2007/0116540 A1 * | 5/2007 | Su | ........... | F16B 25/0063 411/387.1 |

(Continued)

*Primary Examiner* — Gary Estremsky
(74) *Attorney, Agent, or Firm* — Che-Yang Chen; Law Offices of Scott Warmuth

(57) ABSTRACT

A wooden screw may include a shank, a threaded segment, a screw head, a tapered portion and a stem portion. The shank diameter is smaller than the horizontal distance defined as a distance between two opposite ends of the tapered edges, while the width defined as a distance between two symmetric rear portions of blades is between the shank diameter and the horizontal distance, so a drill hole on the wooden material is not contacted with the shank during the screwing process, and the wooden screw also can reduce the friction and provide a complete mechanism for wood chips in accommodation and expulsion. Also, because the diameter of the drill hole is smaller than the horizontal distance, the tapered edges on the threaded segment are much easier to be screwed into wooden material. Therefore, the bonding strength between the wooden screw and the wooden material is increased.

5 Claims, 10 Drawing Sheets

(56) References Cited

U.S. PATENT DOCUMENTS

2010/0158634 A1* 6/2010 Walther .............. F16B 25/0015
411/399
2010/0216560 A1* 8/2010 Huber ...................... B21K 1/56
470/10
2015/0052735 A1* 2/2015 Kochheiser ......... F16B 25/0031
29/525.11

* cited by examiner

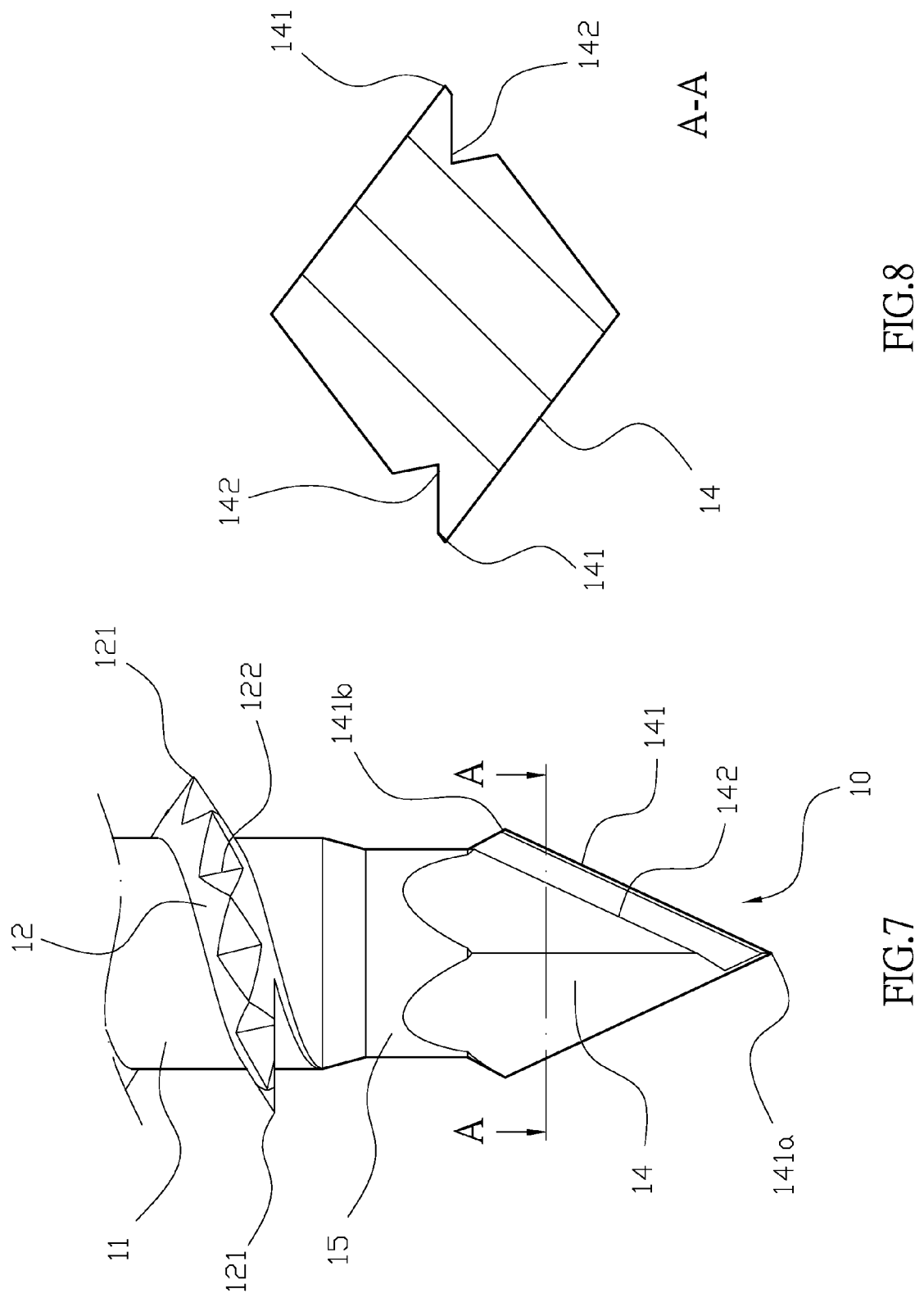

WOODEN SCREW

FIELD OF THE INVENTION

The present invention relates to a wooden screw, and more particularly to a wooden screw that can reduce fiction and is more stable when in use.

BACKGROUND OF THE INVENTION

Generally, wooden materials are secured by wooden screws or nails and the most common way is to use a nail gun. The shortcoming of using the nail gun is that the bonding strength between the nail and wooden material is insufficient and the nails cannot be reused. The other method using the screw and nut to secure wooden materials by screws can increase the bonding strength and reuse a screw along the original opening hole. However, in an actual re-screwing process, the screw cannot be driven along the original opening hole precisely due to uneven force, and the screw may insert into the wooden material with an angle. Also, during the screwing process, because the hardness of screw is higher than the wooden material, the screw can easily and quickly scrape wood chips off from the wooden material, and when the chips cannot be timely removed from the hole, an internal stress may increase in the hole, and the wooden material may break during the screwing process. Moreover, when the traditional screw is directly driven into the wooden material, the fiction may cause the screw to deform to increase the difficulty of process while a large turning torque is required to drive the screw into the wooden material. Therefore, there remains a need for a new and improved design for a wooden screw to overcome the problems presented above.

SUMMARY OF THE INVENTION

The present invention provides a wooden screw, which comprises a shank, and having a shank diameter (A). The threaded segment is formed at an outer periphery of the shank, and tapered edges and chip grooves are formed in a shape of sawtooth at an outer edge of the threaded segment, and a horizontal distance (B) defined as a distance between two opposite ends of the tapered edges. The screw head is formed at an upper end of the shank while the tapered portion is formed at a lower end thereof. Two blades are protruded from symmetric edges of the tapered portion, and each of two recessed portions is formed beside the blade. A tip portion is formed at a bottom edge of the blade while a rear portion is formed at a protruding edge of the blade, and a width (C) defined as a distance between two symmetric rear portions of blades, and the shank diameter (A) is smaller than the horizontal distance (B), while said width (C) is between said shank diameter (A) and horizontal distance (B).

In one embodiment, a plurality of the chip grooves is formed at adjacent sides of the tapered edges on the threaded segment.

In another embodiment, the intervals between the chip grooves are equal.

In still another embodiment, the intervals between the chip grooves (122) on the upper portion of shank are larger than the intervals on the lower portion of shank.

In a further embodiment, the stem portion is formed between the shank of the wooden screw and the tapered portion, and the diameter thereof is smaller than the shank.

In still a further embodiment, the length of the stem portion is between one third and one half of the length of the tapered portion.

In yet a further embodiment, each of two recessed portions is formed beside the blade.

Comparing with conventional wooden screw, the present invention is advantageous because: (i) because the shank diameter (A) is smaller than the horizontal distance (B) and said width (C) is ranging between the shank diameter (A) and the horizontal distance (B), a drill hole on the wooden material is not contacted with the shank during the screwing process. Therefore the wooden screw (10) can reduce the friction generated during the screwing process and provide a complete mechanism for wood chips in accommodation and expulsion. Also, because the diameter of the drill hole is smaller than the horizontal distance (B), the tapered edges on the threaded segment are much easier to be screwed into wooden material. Therefore the bonding strength between the wooden screw and the wooden material is increased; (ii) the number of the chip grooves on lower portion of shank is more than the number on the upper portion of shank while the intervals between the chip grooves on the lower portion of shank are smaller than the intervals on the upper portion of shank, so the chip grooves on lower portion of shank can higher the efficiency of expelling the wood chips. Although the holding compartment of the chip grooves for the wood chips on the upper portion of the shank is smaller than the lower portion thereof, the main purpose of the upper chip grooves is to enhance the bonding strength of wooden screw and the contact areas between the threaded segment and the wooden material; and (iii) the length of the stem portion is between one third and one half of the length of the tapered portion, the chip grooves have enough spaces to accommodate the wood chips, and is capable of increasing the efficiency of the screwing process. Also, in the screwing process, the threaded segment of the wooden screw can improve the shortcoming of the bit stops.

BRIEF DESCRIPTION OF THE DRAWINGS

FIG. 7 is a plane view of the tapered portion of the wooden screw in the present invention.

FIG. 8 is a sectional view along line A-A of the wooden screw in the present invention.

DETAILED DESCRIPTION OF THE INVENTION

The detailed description set forth below is intended as a description of the presently exemplary device provided in accordance with aspects of the present invention and is not intended to represent the only forms in which the present invention may be prepared or utilized. It is to be understood, rather, that the same or equivalent functions and components may be accomplished by different embodiments that are also intended to be encompassed within the spirit and scope of the invention.

Unless defined otherwise, all technical and scientific terms used herein have the same meaning as commonly understood to one of ordinary skill in the art to which this invention belongs. Although any methods, devices and materials similar or equivalent to those described can be used in the practice or testing of the invention, the exemplary methods, devices and materials are now described.

All publications mentioned are incorporated by reference for the purpose of describing and disclosing, for example, the designs and methodologies that are described in the publications that might be used in connection with the presently described invention. The publications listed or discussed above, below and throughout the text are provided solely for their disclosure prior to the filing date of the present application. Nothing herein is to be construed as an admission that the inventors are not entitled to antedate such disclosure by virtue of prior invention.

Figure 1:
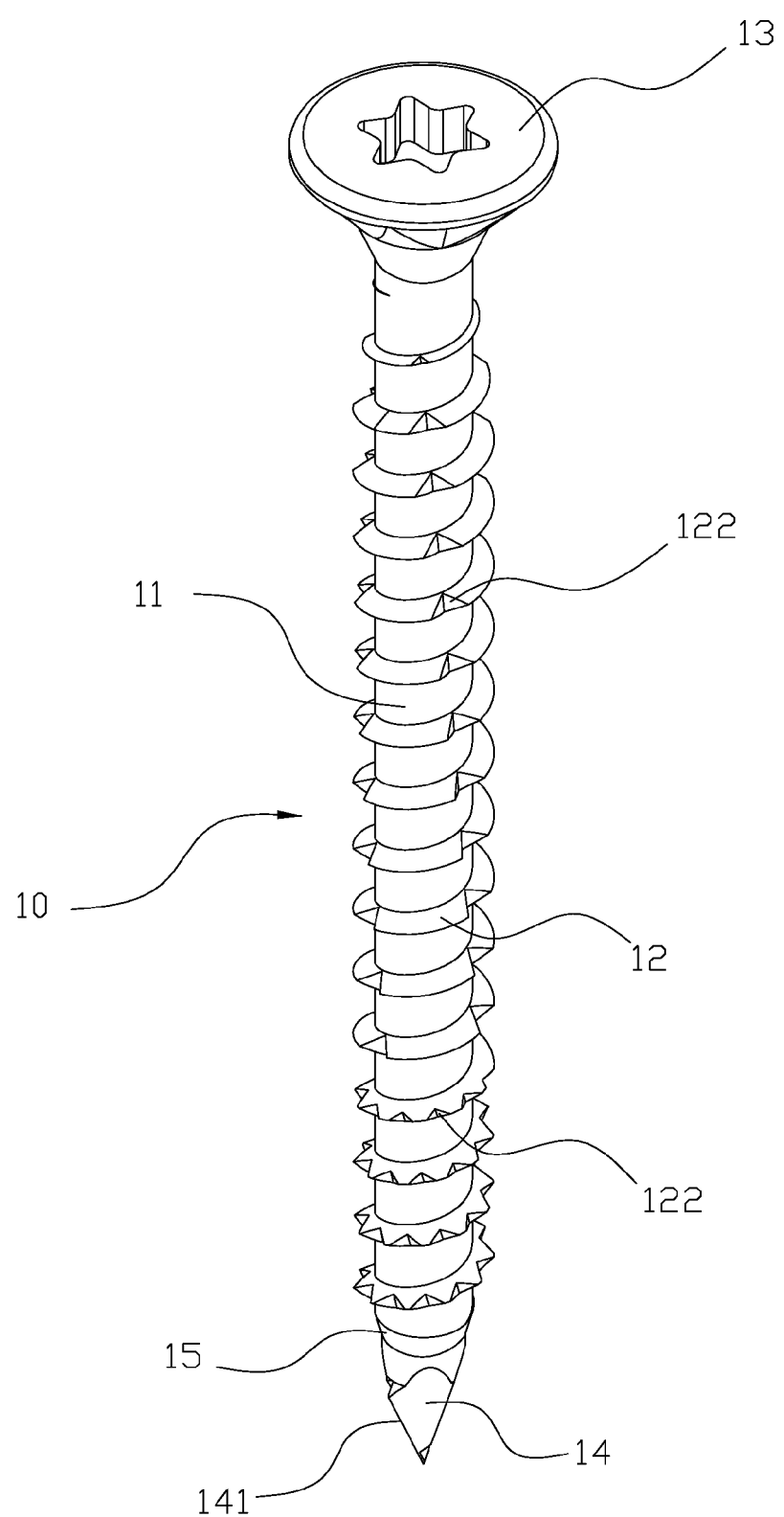
FIG. 1 is a three-dimensional view of the wooden screw of the present invention.
Figure 2:
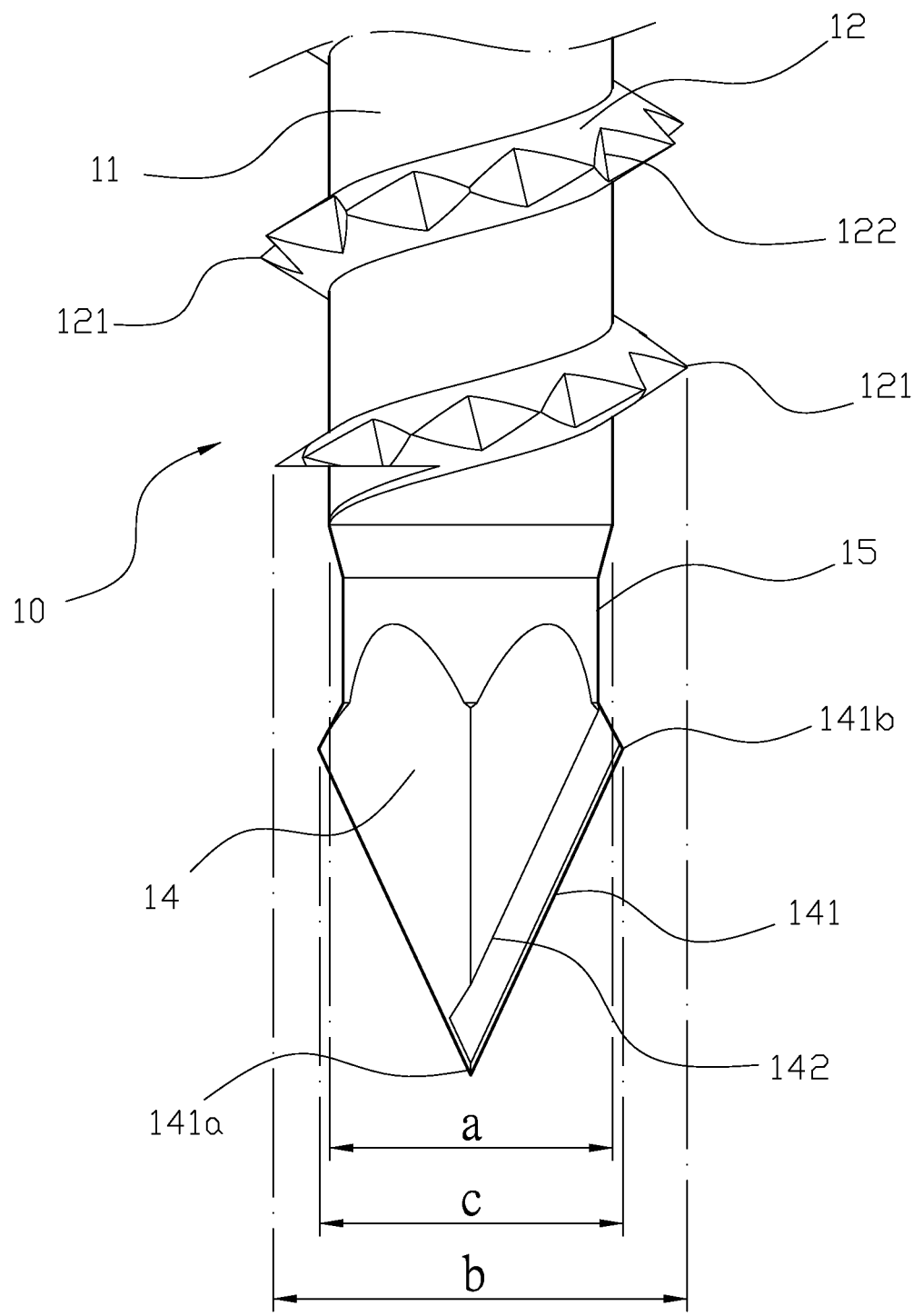
FIG. 2 is a partial enlarged drawing of FIG. 1 of the wooden screw in the present invention.
Figure 3:
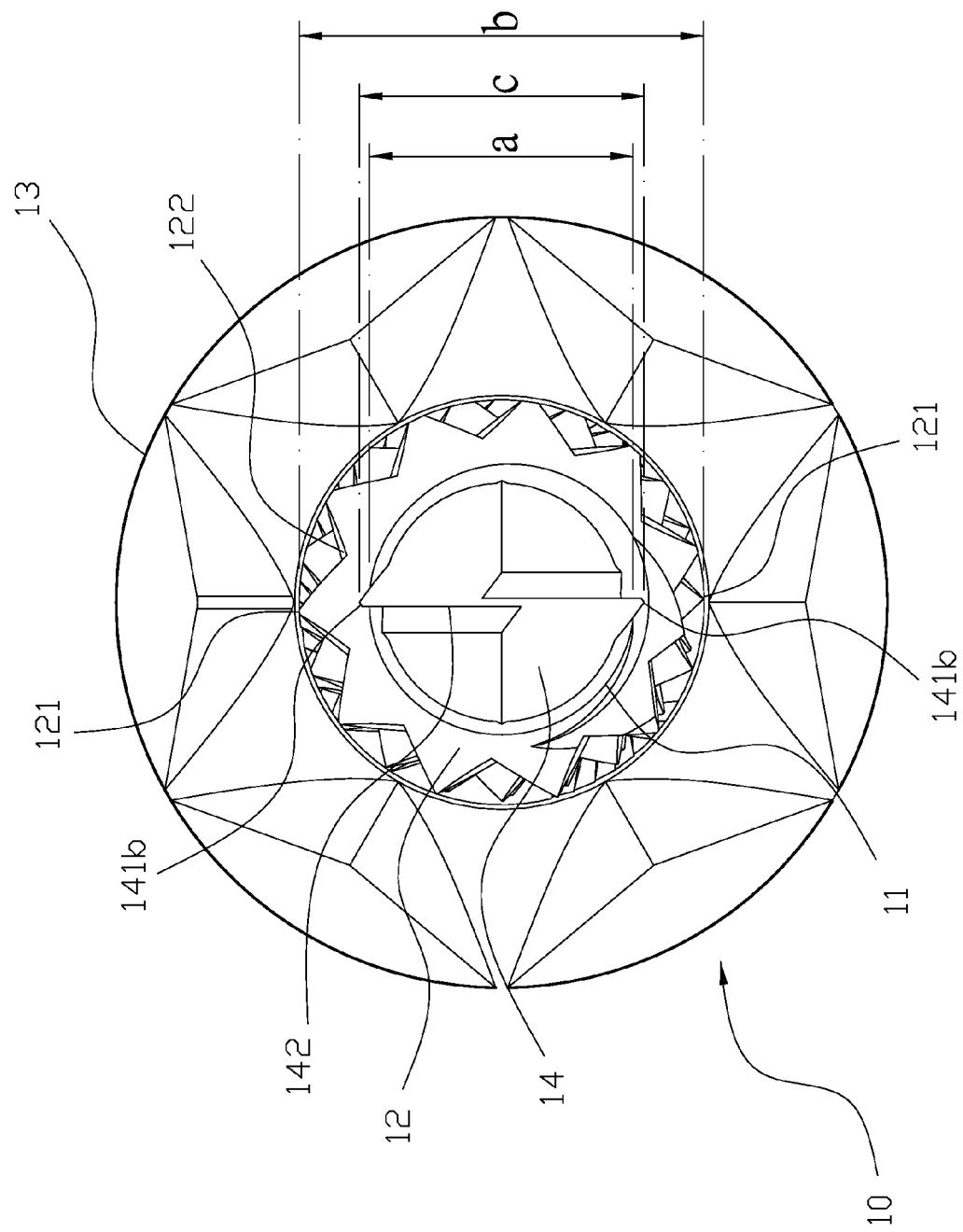
FIG. 3 is a bottom view of the wooden screw in the present invention.
Figure 4:
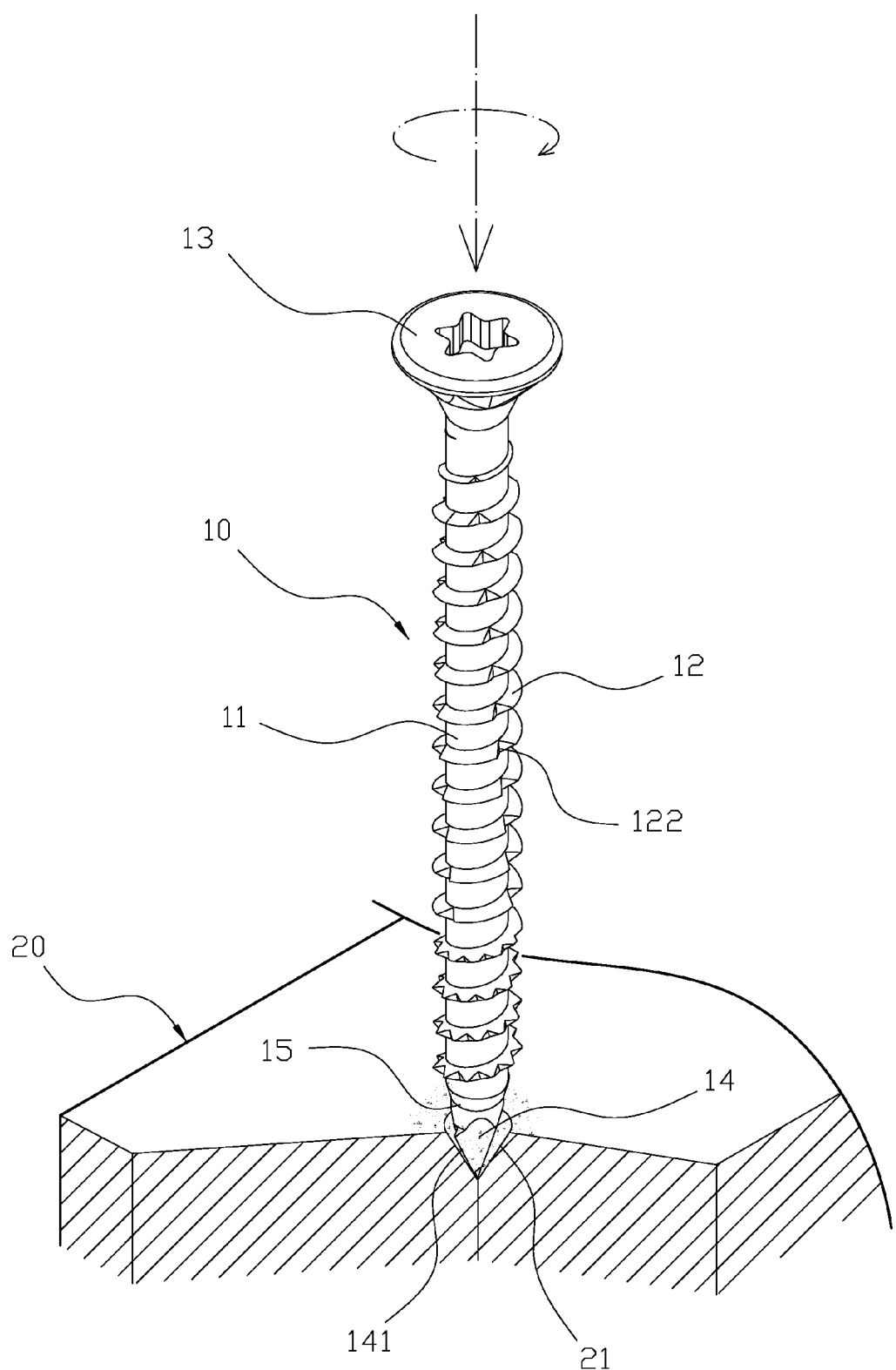
FIG. 4 is one schematic view of the wooden screw in the present invention.
Figure 5:
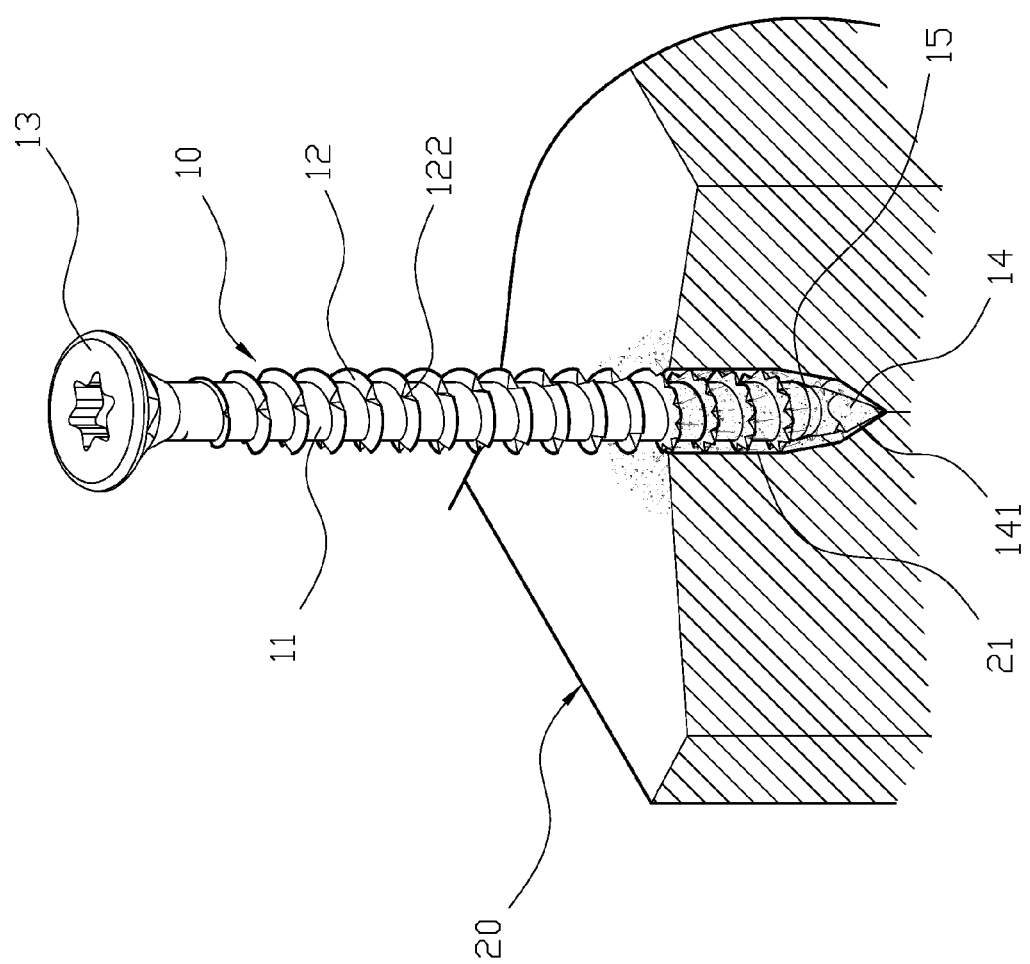
FIG. 5 is another schematic view of the wooden screw in the present invention.
Figure 6:
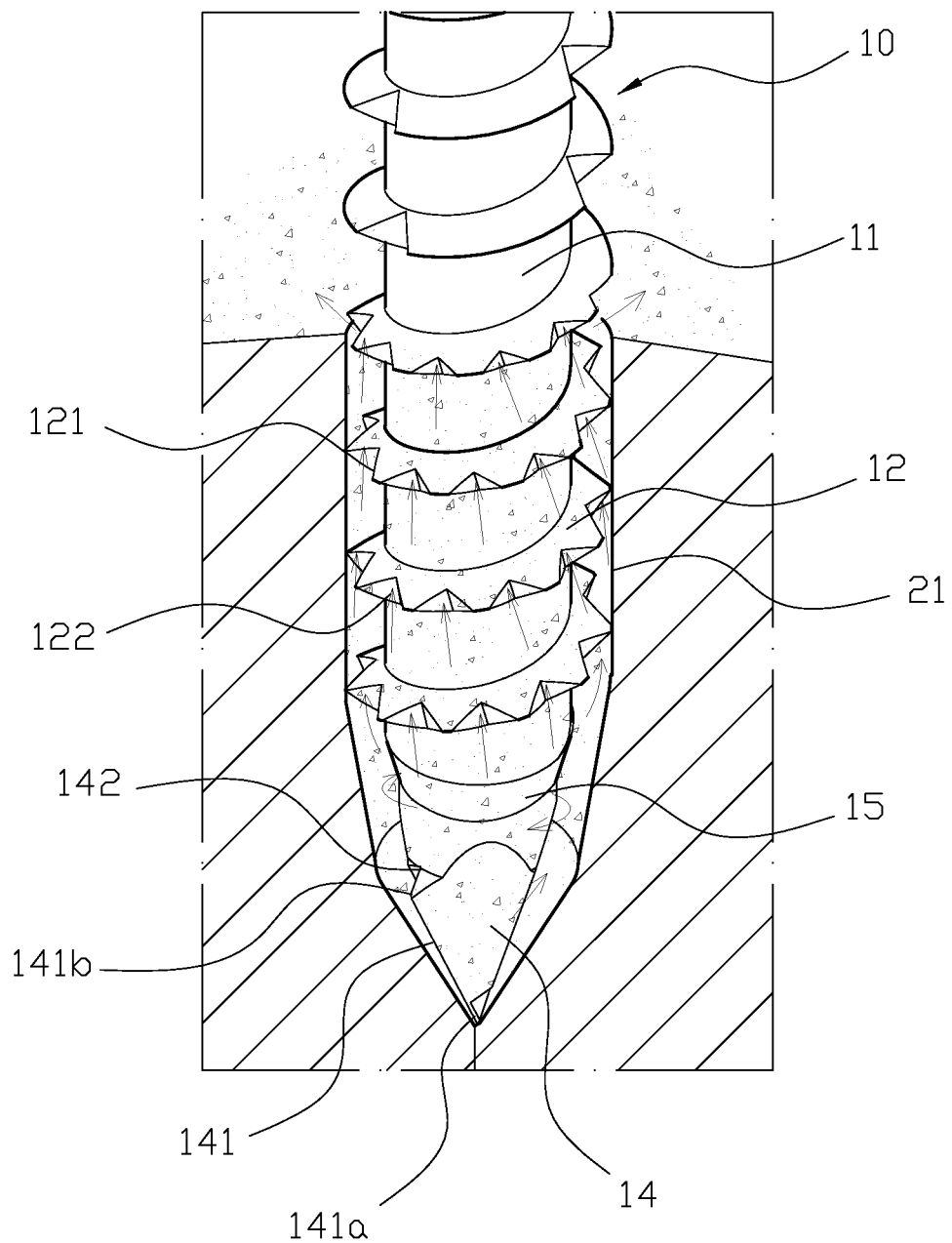
FIG. 6 is still another schematic view of the wooden screw in the present invention.
Figure 9:
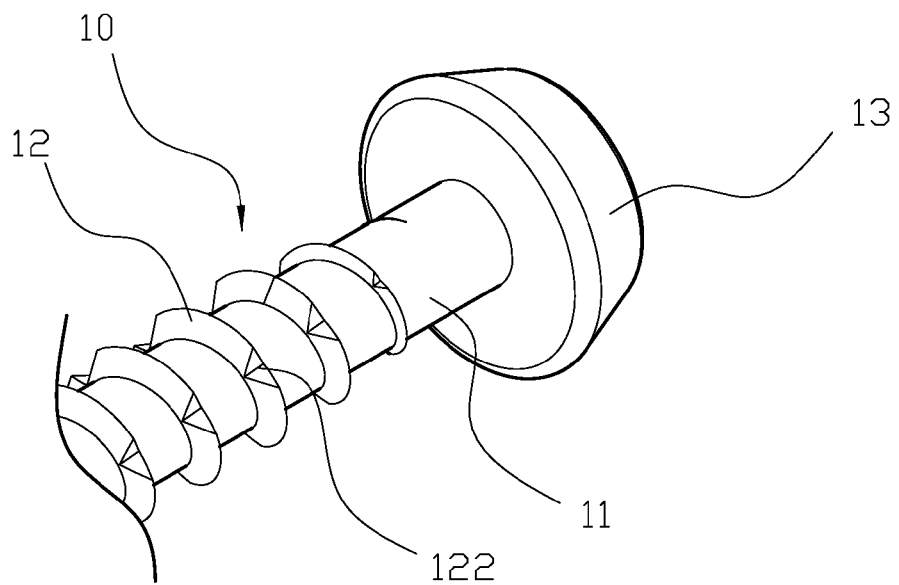
FIG. 9 is a schematic view of one embodiment of the wooden screw in the present invention.
Figure 10:
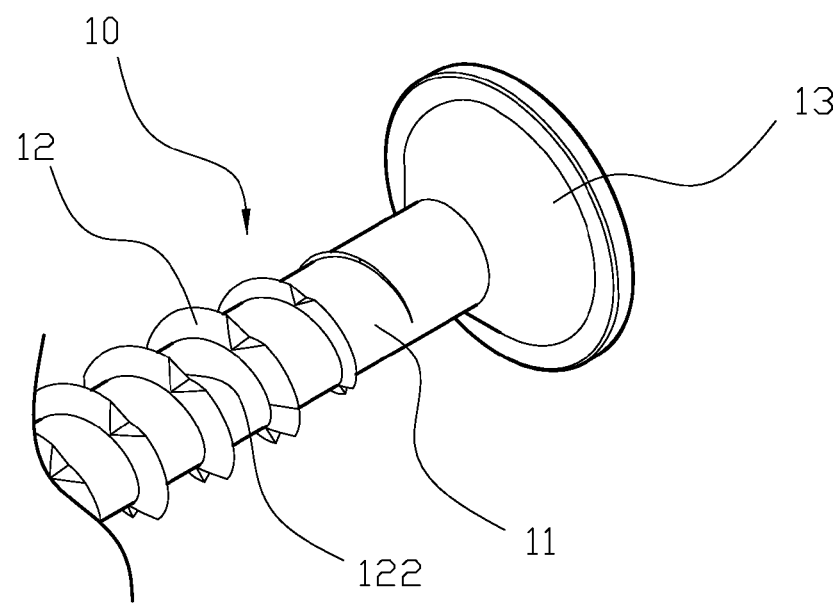
FIG. 10 is a schematic view of another embodiment of the wooden screw in the present invention.
Figure 11:
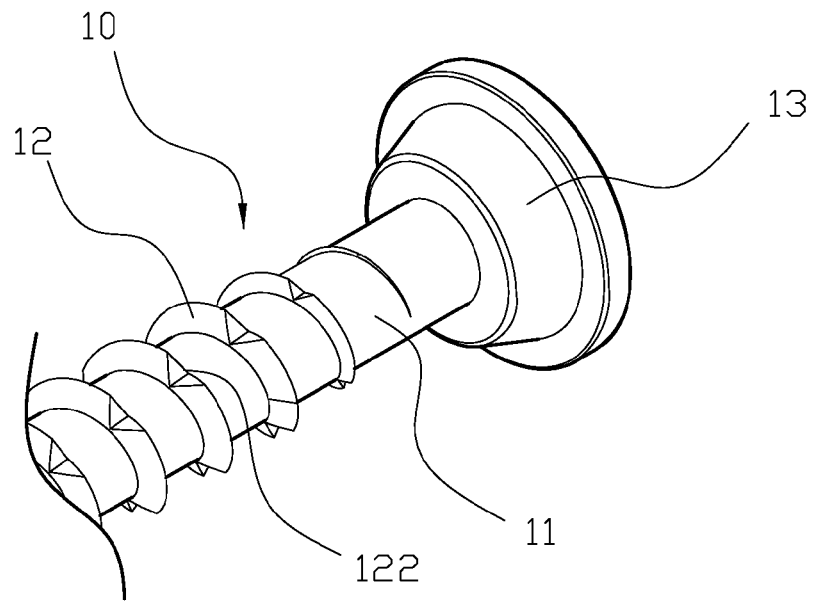
FIG. 11 is a schematic view of still another embodiment of the wooden screw in the present invention.
Figure 12:
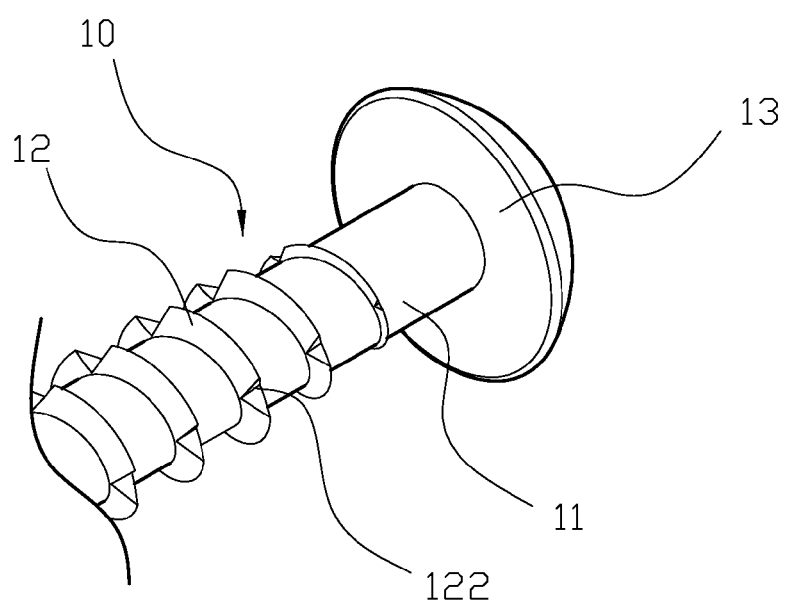
FIG. 12 is a schematic view of further embodiment of the wooden screw in the present invention.

In order to further understand the goal, characteristics and effect of the present invention, a number of embodiments along with the drawings are illustrated as following:

Referring to FIGS. 1 to 3, the present invention provides a wooden screw (10), which comprises a shank (11), a threaded segment (12), a screw head (13), a tapered portion (14) and a stem portion (15). The shank (10) has a shank diameter (A) (as shown in FIG. 2), and the threaded segment (12) is formed at an outer periphery of thereof. Tapered edges (121) and chip grooves (122) are formed in a shape of sawtooth at an outer edge of the threaded segment (12), and a horizontal distance (B) (as shown in FIG. 2) is defined as a distance between two opposite ends of the tapered edges (121). The screw head (13) is formed at an upper end of the shank (11) while the tapered portion (14) is formed at a lower end thereof, and a plurality of the chip grooves (122) is formed at adjacent sides of the tapered edges (121) on the threaded segment (12). In one embodiment, the intervals between the chip grooves (122) are equal, and in another embodiment, the intervals between the chip grooves (122) on the upper portion of shank (11) are larger than the intervals on the lower portion of shank (11). Two blades (141) are protruded from symmetric edges of the tapered portion (14), and each of two recessed portions (142) is formed beside the blade (141). A tip portion (141a) is formed at a bottom edge of the blade (14) while a rear portion (141b) is formed at a protruding edge of the blade (141), and a width (C) is defined as a distance between two symmetric rear portions (141b) of blades (141) (as shown in FIG. 2). The shank diameter (A) is smaller than the horizontal distance (B), while said width (C) is ranging between said shank diameter (A) and horizontal distance (B). The stem portion (15) is formed between the shank (11) of the wooden screw (10) and the tapered portion (14), and the diameter thereof is smaller than the shank (11), and the length of the stem portion (15) is between one third and one half of the length of the tapered portion (14).

In actual application, referring to FIGS. 2 and 4 to 6, the wooden screw (10) in present invention is used for securing the wooden material (20), and the shank diameter (A) is smaller than the horizontal distance (B), while the width (C) is between the shank diameter (A) and the horizontal distance (B). During the screwing process, the tapered portion (14) of the wooden screw (10) is compressed against to the wooden material (20), and the screwing action is driven by screwing the screw head (13). The tip portion (141b) of the blade (141) on the tapered portion (14) is screwed into the wooden material (20), and symmetrical blades are configured to achieve the shaving effect and avoid the screw skewed during the screwing process. Referring to FIGS. 7 and 8, the recessed portion (142) beside the blades (141) is configured to accommodate the wood chips, and the wood chips are compressed forward to the stem portion (15), and because the diameter of stem portion (14) is smaller than the shank diameter (A), the stem portion (14) can provide enough space for accommodating the wood chips, and prevent the wood chips from sticking the chip grooves (122) and disabling the function of the wooden screw (10). Because the length of the stem portion (15) is between one third and one half of length of the tapered portion (14), the chip grooves (122) have enough spaces to accommodate the wood chips, and is capable of increasing the efficiency of the screwing process. Also, in the screwing process, the threaded segment (12) of the wooden screw (10) can improve the shortcoming of the bit stops, secure the wooden screw (10), and achieve the efficiency of labor saving through the cutting with an angle to the wooden material (20). The internal stress inside the wooden material (20) is eliminated while the wood chips can be upward removed out of the hole, and the screwing operation can prevent the wooden material (20) from being cracked. Furthermore, the number of the chip grooves (122) on lower portion of shank (11) is more than the number on the upper portion of shank (11) while the intervals between the chip grooves (122) on the lower portion of shank (11) are smaller than on the upper portion of shank (11), so the chip grooves (122) on lower portion of shank (11) can higher the efficiency of expelling the wood chips. Although the holding compartment of the chip grooves (122) for wood chips on the upper portion of the shank (11) is smaller than the lower portion thereof, the main purpose of the upper chip grooves (122) is to enhance the bonding strength of wooden screw (10) and the contact areas between the threaded segment (12) and the wooden material (20).

Figure 13:
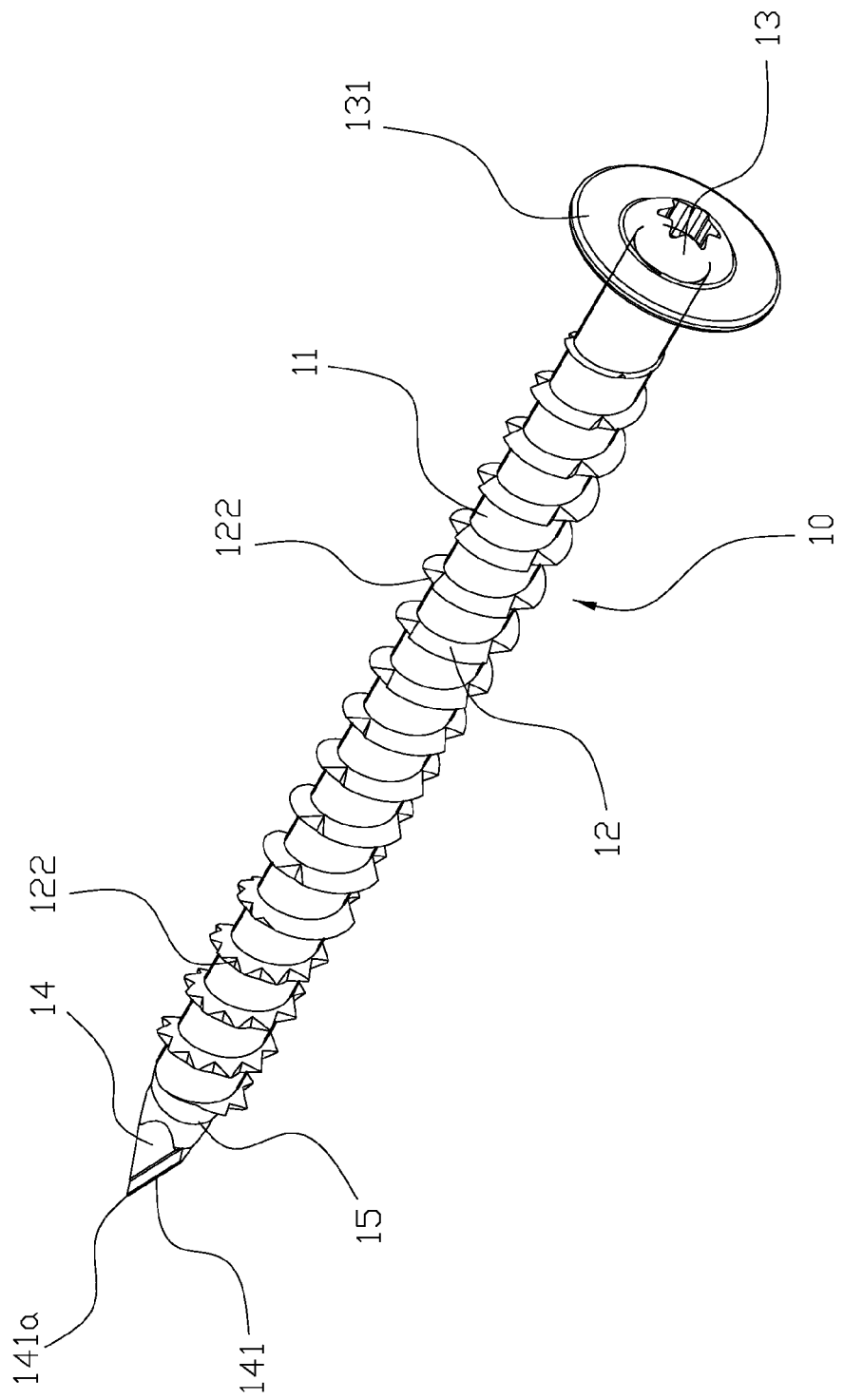
FIG. 13 is a schematic view of still further embodiment of the wooden screw in the present invention.

Referring to FIGS. 9 to 12, the screw head (13) of the wooden screw (10) is driven by hand tools or power tools. In one embodiment, one side of the screw head (13) facing to the shank (11) is shaped into a flat, a cone, or a step-like cone while the other side (upper side) thereof is shaped into a flat, a cone or a step-like cone, and the upper side of the screw head (13) can connect with the different hand tools or power tools. Referring to FIG. 13, a gasket (131) formed at a periphery of the screw head (13) is configured to increase the contact areas with the wooden material (20).

Comparing with conventional wooden screw, the present invention is advantageous because the shank diameter (A) is smaller than the horizontal distance (B), while the width (C) is between the shank diameter (A) and the horizontal distance (B), so a drill hole (21) on the wooden material (20) is not contacted with the shank (11) during the screwing process. Therefore, the wooden screw (10) can reduce the friction generated during the screwing process and provide a complete mechanism for wood chips in accommodation and expulsion. Also, because the diameter of the drill hole (21) is smaller than the horizontal distance (B), the tapered edges (121) on the threaded segment (12) are much easier to be screwed into wooden material (20). Therefore, the bonding strength between the wooden screw (10) and the wooden material (20) is increased.

Having described the invention by the description and illustrations above, it should be understood that these are exemplary of the invention and are not to be considered as limiting. Accordingly, the invention is not to be considered as limited by the foregoing description, but includes any equivalents.

What is claimed is:

1. A wooden screw comprising:
   a shank having a shank diameter (A), a threaded segment formed at an outer periphery of the shank, and tapered edges and chip grooves formed in a shape of sawtooth at an outer edge of the threaded segment, and a horizontal distance (B) defined as a distance between two opposite ends of the tapered edges, and a screw head formed at an upper end of the shank while a tapered portion formed at a lower end thereof, and two protruding blades having symmetric edges formed on the tapered portion, and a tip portion formed at a bottom edge of the blade while a rear portion formed at a protruding edge of the blade, and a width (C) defined as a distance between two symmetric rear portions of blades, wherein the shank diameter (A) is smaller than the horizontal distance (B), while said width (C) is ranging between said shank diameter (A) and horizontal distance (B),
   wherein a stem portion is formed between the shank of the wooden screw and the tapered portion, and the diameter thereof is smaller than the shank, and the length of the stem portion is between one third and one half of the length of the tapered portion.

2. The wooden screw of claim 1, wherein a plurality of the chip grooves are formed at adjacent sides of the tapered edges on the threaded segment.

3. The wooden screw of claim 1, wherein the intervals between the chip grooves are equal.

4. The wooden screw of claim 1, wherein the intervals between the chip grooves on the upper portion of shank are larger than the intervals on the lower portion of shank.

5. The wooden screw of claim 1, wherein each of two recessed portions is formed beside the blade.

* * * * *